(12) United States Patent
Fang et al.

(10) Patent No.: US 8,352,405 B2
(45) Date of Patent: Jan. 8, 2013

(54) INCORPORATING LEXICON KNOWLEDGE INTO SVM LEARNING TO IMPROVE SENTIMENT CLASSIFICATION

(75) Inventors: Ji Fang, Mountain View, CA (US); Bi Chen, ShangYu (CN)

(73) Assignee: Palo Alto Research Center Incorporated, Palo Alto, CA (US)

( * ) Notice: Subject to any disclaimer, the term of this patent is extended or adjusted under 35 U.S.C. 154(b) by 4 days.

(21) Appl. No.: 13/091,405

(22) Filed: Apr. 21, 2011

(65) Prior Publication Data

US 2012/0271788 A1 Oct. 25, 2012

(51) Int. Cl.
*G06F 17/00* (2006.01)
*G06N 5/02* (2006.01)
(52) U.S. Cl. .......................................................... 706/50
(58) Field of Classification Search .................. None
See application file for complete search history.

(56) References Cited

U.S. PATENT DOCUMENTS

2011/0093417 A1* 4/2011 Nigam et al. .................. 706/12

OTHER PUBLICATIONS

Prabowo et al. "Sentiment analysis: A combined approach", Journal of Informatics 3, 2009, pp. 143-157.*
Zhou et al., "Ontology-Supported Polarity Mining", IST, 59(1), 2008, pp. 98-110.*
Boiy et al. "A Machine Learning Approach to Sentiment Analysis in Multilingual Web Texts", Information Retrieval, vol. 12, Issue 5, 2008, pp. 30.*
Li et al. "Sentiment Classification through Classifiers with Multiple Feature Sets", NLP-KE 2007, pp. 135-140.*
Boiy et al. "A Machine Learning Approach to Sentiment Analysis in Multilingual Web Texts", Information Retrieval 2009, pp. 30.*
Jijkoun et al., "Generating focused topic-specific sentiment lixicon", in Proceedings of ACL, 2010, pp. 10.
Zhuang, et al., "Movie review mining and summarization", in Proceedings of the CIKM, 2006, pp. 8.
Hatzivassiloglou et al., "Predicting the semantic orientation of adjectives", in Proceedings of ACL, 1997, pp. 8.
Fahrni et al., "Old wine or warm beer: target-specific sentiment analysis adjectives", Institute of Computational Linguistics, Univ. of Zurich, Switzerland, 2008, vol. 2, Issue 3, pp. 60-63.
Kim et al., "Determining the Sentiment of Opinions", in Proceedings of the COLING, 2004, pp. 7.
Hu et al., "Mining and summarizing customer reviews", in Proceedings of the KDD, 2004, pp. 10.
Dang et al., "A lexicon enhanced method for sentiment classification: An experiment on online product reviews", IEEE Intelligent Systems, 25, 2010, pp. 23.
Mohammad et al., "Generating high-coverage semantic orientation lexicons from overtly marked words and a thesaurus", in Proceedings of the EMNLP, 2009, pp. 10.

(Continued)

*Primary Examiner* — Jeffrey A Gaffin
*Assistant Examiner* — Li-Wu Chang
(74) *Attorney, Agent, or Firm* — Fay Sharpe LLP

(57) ABSTRACT

A sentiment classifier for sentiment classification of content. An aspect classifier is configured to classify content as being related to a particular aspect of information, the aspect classifier incorporating at least a portion of the domain specific sentiment lexicon. A polarity classifier is then configured to classify the content classified by the aspect classifier as having one of a positive sentiment of the particular aspect of information, a negative sentiment of the particular aspect of information or as having no sentiment as to the particular aspect of information. The polarity classifier also incorporating at least a portion of the domain specific sentiment lexicon.

18 Claims, 11 Drawing Sheets

OTHER PUBLICATIONS

Andreevskaia et al., "When specialists and generalists work together: overcoming domain independence in sentiment tagging", in Proceedings of ACL, 2008, pp. 9.

Wilson et al., "Recognizing contextual polarity in phrase-level sentiment analysis", in Proceedings of the HLT-EMNLP, 2005, pp. 8.

Sindhwani et al., "Document-word co-regularization for semi-supervised sentiment analysis", in Proceedings of the ICDM, 2008, pp. 6.

Melville, "Sentiment analysis of blogs by combining lexical knowledge with text classification", in Proceedings of the KDD, 2009, pp. 9.

Blitzer et al., "Biographies, Bollywood, Boom-boxes, and Blenders", 2007, Domain adaptation for sentiment classification; in Proceedings of the Association for Computational Linguistics, pp. 8.

Chang, et al., "LIBSVM: A Library for Support Vector Machines", 2001, Software available at http://www.csie.ntu.edu.tw/cjlin/libsvm, pp. 39.

Fang, et al., "Pruning Non-Informative Text Through Non-Expert Annotations to Improve Aspect-level Sentiment Classification", in Proceedings of Coling 2010: 2nd Workshop on the people's Web Meets NLP: Collaboratively Constructed Semantic Resources, 2010, pp. 9.

Pang, et al., "Thumbs up? Sentiment Classification Using Machine Learning Techniques", 2002, in Proceedings of the EMNLP, pp. 8.

Wiebe et al., "Annotating Expressions of Opinions and Emotions in Language", Language Resources and Evaluation, 39, 2005, pp. 8.

Zhou L., et al., Ontology-Supported Polarity Mining, Journal of the American Society for Information Science and Technology, 59(1) 98-110, 2008.

Gamon M., Sentiment Classification on Customer Feedback Data Noisy Data, Large Feature Vectors, and the Role of Linguistic Analysis, Microsoft Research. Article No. 841, Stroudsburg, PA, 2004.

Rijsbergen C.J., et al., British Library R & D Report No. 5587, New Models in Probabilistic Information Retrieval, Cambridge, England, 1980.

Fellbaum C., WordnetL An Electronic Lexical Database. MIT Press, Cambridge, MA, 1998.

Bing Liu, Web Data Mining, 2007, Springer, New York, pp. 411-447.

Zhao et al., Jointly Modeling Aspects and Opinions with a MaxEnt-LDA Hybrid, in Proceedings of EMNLP, 2010, pp. 56-65, MIT, Massachusetts, US.

Popescu et al., Extracting Product Features and Opinions from Reviews, Proceedings of HLT/EMNLP, pp. 339-346, Vancouver, CA, Oct. 2005.

Wiebe et al., Development and Use of a Gold-Standard Data Set for Subjectivity Classifications, ACL 1999 Proceedings of the 37th annual meeting of the Association for Computational Linguistics on Computational Linguistics, pp. 246-253.

Wiebe et al., Annotating expressions of opinions and emotions in language, 2005, Language Resources and Evaluation, 39.

\* cited by examiner

INCORPORATING LEXICON KNOWLEDGE INTO SVM LEARNING TO IMPROVE SENTIMENT CLASSIFICATION

BACKGROUND

The present application is directed to automated classification and more particularly to automated sentiment classification, where sentiment classification is understood to be a specific type of text categorization that works to classify the opinion or sentiment of information, such as in the form of text, as it relates to a particular topic or subject.

Two typical approaches to sentiment analysis are lexicon look up and machine learning. A lexicon look up approach normally starts with a lexicon of positive and negative words. For instance, 'beautiful' is identified as a positive word and 'ugly' is identified as a negative word. The overall sentiment of a text is determined by the sentiments of a group of words and expressions appearing in the text.

A comprehensive sentiment lexicon can provide a simple yet effective solution to sentiment analysis, because it is general and does not require prior training. Therefore, attention and effort have been paid to the construction of such lexicons. However, a significant challenge to this approach is that the polarity of many words is domain and context dependent. For example, 'long' is positive in 'long battery life' and negative in 'long shutter lag.' Current sentiment lexicons do not capture such domain and context sensitivities of sentiment expressions. They either exclude such domain and context dependent sentiment expressions or tag them with an overall polarity tendency based on statistics gathered from certain corpus such as the world wide web accessed via the internet. While excluding such expressions leads to poor coverage, simply tagging them with a polarity tendency leads to poor precision.

Because of these limitations, machine learning approaches have been gaining increasing popularity in the area of sentiment analysis. A machine learning approach such those using Support Vector Machine (SVM) does not rely on a sentiment lexicon to determine the polarity of words and expressions, and can automatically learn some of the context dependencies illustrated in the training data. For example, if 'long battery life' and 'long shutter lag' are labeled as positive and negative respectively in the training data, a learning algorithm can learn that 'long' is positive when it is associated with the phrase 'battery life' whereas it is negative when associated with the phrase 'shutter lag'.

However, the success of such an approach relies heavily on the training data. For the task of sentiment analysis, data scarcity is an inherent issue that cannot easily be solved due to the richness of natural language. Particularly, people tend to use different expressions to express the same sentiment, and also tend not to repeat their sentiments in the same sentence or document. Consequently, it is very difficult to collect training data that adequately represents how people express sentiments towards various subject matters. This data scarcity issue has resulted in relatively low accuracy for sentiment classification compared to some other text classification tasks.

Therefore, although recent studies have shown that machine learning approaches in general outperform the lexicon look up approaches for the task of sentiment analysis, ignoring the advantages and knowledge provided by sentiment lexicons may not be optimal.

However, few studies have been devoted to combining these two approaches to improve sentiment classification. Some have explored using a general purpose sentiment dictionary to improve the identification of the contextual polarity of phrases. A few other recent studies have shown that incorporating a general purpose sentiment lexicon into machine learning algorithms can improve the accuracy of sentiment classification at the document level. In all of these works, a general purpose sentiment lexicon contains words with context/domain independent polarities. The present sentiment classifier system and method differs from these previous approaches.

BRIEF DESCRIPTION

A sentiment classifier for sentiment classification of content. An aspect classifier is configured to classify content as being related to a particular aspect of information, the aspect classifier incorporating at least a portion of the domain specific sentiment lexicon. A polarity classifier is then configured to classify the content classified by the aspect classifier as having one of a positive sentiment of the particular aspect of information, a negative sentiment of the particular aspect of information or as having no sentiment as to the particular aspect of information. The polarity classifier also incorporating at least a portion of the domain specific sentiment lexicon.

DETAILED DESCRIPTION

Figure 1:
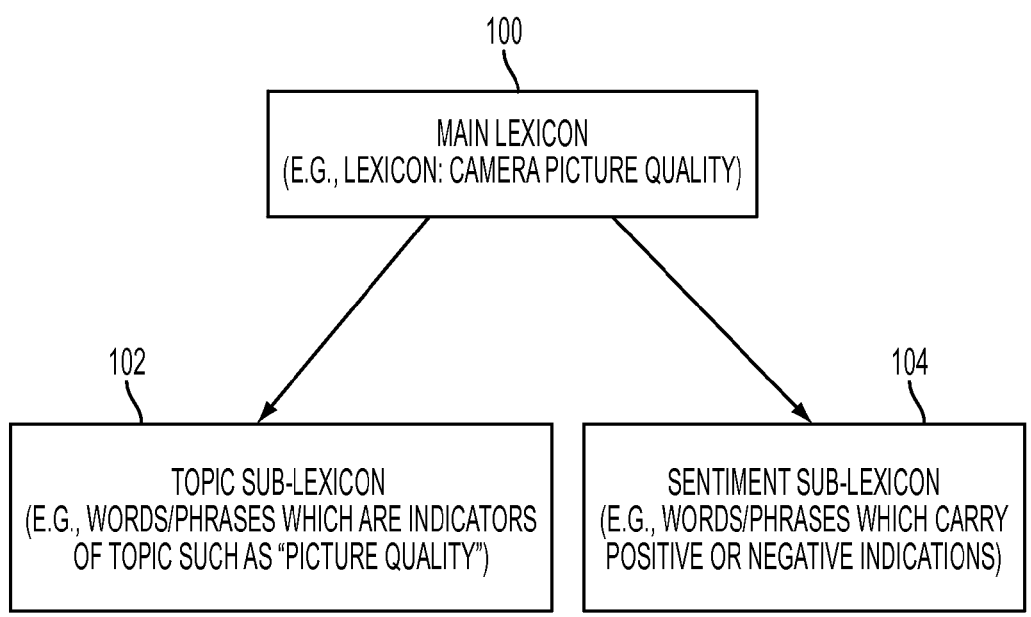
FIG. 1 illustrates a name lexicon having two sub-lexicons, including a topic sub-lexicon and a sentiment sub-lexicon.

Disclosed is a sentiment classification system and method that incorporates sentiment lexicons as prior knowledge with machine learning approaches such as Support Vector Machines (SVM) to improve the accuracy of sentiment analysis. The described system and method generates domain specific sentiment lexicons for this learning purpose. Results of experiments undertaken implementing the above concepts show that compared to general purpose domain independent sentiment lexicons, domain specific lexicons incorporated into machine learning approaches lead to more significant accuracy improvement in the sentiment classification process.

The sentiment classification system (also called herein the sentiment classifier or two-level sentiment classifier) and method described herein provide a fine grained sentiment analysis of aspects of information.

It is noted that in this disclosure an aspect of information (or also called herein information aspect) is a general term which among other uses includes aspects of a product (e.g., a product aspect—such as an aspect of a camera), a topic (e.g., topic aspect—such as the weather), etc. The information is provided in the form of text (i.e., content) comprising words and/or phrases.

In the following, for purposes of explanation, the sentiment classification task is primarily directed to classifying camera reviews. Namely, for each sentence in a camera review, the disclosed sentiment classifier is configured to predict whether the sentence under investigation discusses any camera aspect (e.g., a battery life of the camera; the quality of the pictures taken by a camera, etc.), and if the sentence does discuss a camera aspect being considered the sentiment classifier identifies the associated sentiment (e.g., is the opinion positive or negative). The experimental results described herein show that the accuracy of the sentiment classification task is significantly improved by incorporating domain specific sentiment lexicons generated by the present approach.

As discussed, only a few studies have been devoted to combining lexicon lookup and machine learning approaches to improve sentiment classification. Unlike the previous works in which only a general purpose sentiment lexicon is used, the present sentiment classifier incorporates not only a general purpose sentiment lexicon but also domain specific sentiment lexicons into the learning machine (e.g., SVM learning) to improve the accuracy of sentiment classification. The domain specific sentiment lexicons include lexicons indicating various topics or domains as well as lexicons consisting of words or phrases with polarities associated with a particular topic or domain.

For example, in the conducted experiments, domain specific lexicons were built regarding 'Battery Life' that include a first lexicon of words such as 'battery' and a second lexicon of words or phrases such as 'quickly:negative' and 'long:positive.' The first lexicon consists of words or phrases that are good indicators for the topic of 'Camera Battery Life', while the second lexicon consists of words or phrases with polarities specific to the topic of 'Battery Life'. For instance, 'quickly' and 'long' may not carry negative and positive sentiments in a different domain. They can also carry opposite sentiments if the domain is different. More importantly, the experimental results show that while a general purpose sentiment lexicon provides only minor accuracy improvement, incorporating domain specific lexicons (dictionaries) leads to more significant improvement for the sentiment classification task.

Second, the previous work explores the advantages of incorporating lexicon knowledge to improve sentiment classification at the document level, namely, to classify an entire document to be either positive or negative. Compared to these works, the present sentiment classifier is fine grained. Particularly, sentiment classification is performed at the sentence level, and for each sentence, the sentiment classifier not only predicts whether a sentence is positive, negative or objective, it also predicts the main topic associated with that sentiment. The experiments demonstrated that the domain specific lexicons (dictionaries) built by the inventors led to improvement for both of these tasks.

Regarding the construction of sentiment lexicons, previous studies have focused on generating general purpose dictionaries. These methods range from manual approaches to semi-automated and automated approaches. In this disclosure the domain specific sentiment lexicons are built using a combination of (i) corpus filtering, (ii) web searching using linguistic patterns and (iii) dictionary expansion techniques. This construction is described in detail below.

1. Generating Domain Specific Lexicons

The following describes an approach to generate domain specific lexicons using as its example the topic of digital cameras. However, it is to be understood this approach is applicable to other areas as well and the topic of cameras is only provided as a convenient example.

As discussed above, the sentiments of many words or phrases are context or domain dependent. For example, 'long' is positive if it is associated with the camera aspect of 'Battery Life'. However, the same word carries negative sentiment when it is associated with the camera aspect of 'Shutter Lag'. Therefore, it is critical to know the topic/domain being discussed when trying to determine the associated sentiment.

Based on this observation, domain/topic specific lexicons are built covering both expressions indicating a specific domain and expressions indicating different sentiments associated with that particular domain. For example, as shown in FIG. 1, the lexicon regarding the domain/topic 'Camera Picture Quality' 100 consists of two sub-lexicons. A first sub-lexicon 102 includes words and/or phrases such as picture, image, photo, close up etc, which are good indicators for the domain/topic of 'Picture Quality' in the area of digital cameras. The other sub-lexicon 104 includes words and/or phrases that carry positive or negative sentiments if the associated domain/topic is Camera Picture Quality 100. For example, this second sub-lexicon 104 would indicate that while 'sharp' and 'clear' are positive, 'blurry' is negative when they are associated with the quality of a picture (i.e., the domain/topic: Camera Picture Quality 100). This goal is achieved by using the mentioned combination of (i) corpus filtering, (ii) web searching with linguistic patterns and (iii) dictionary expansion. Each of these techniques is described in detail in the following subsections.

1.1 Corpus Filtering

Figure 2:
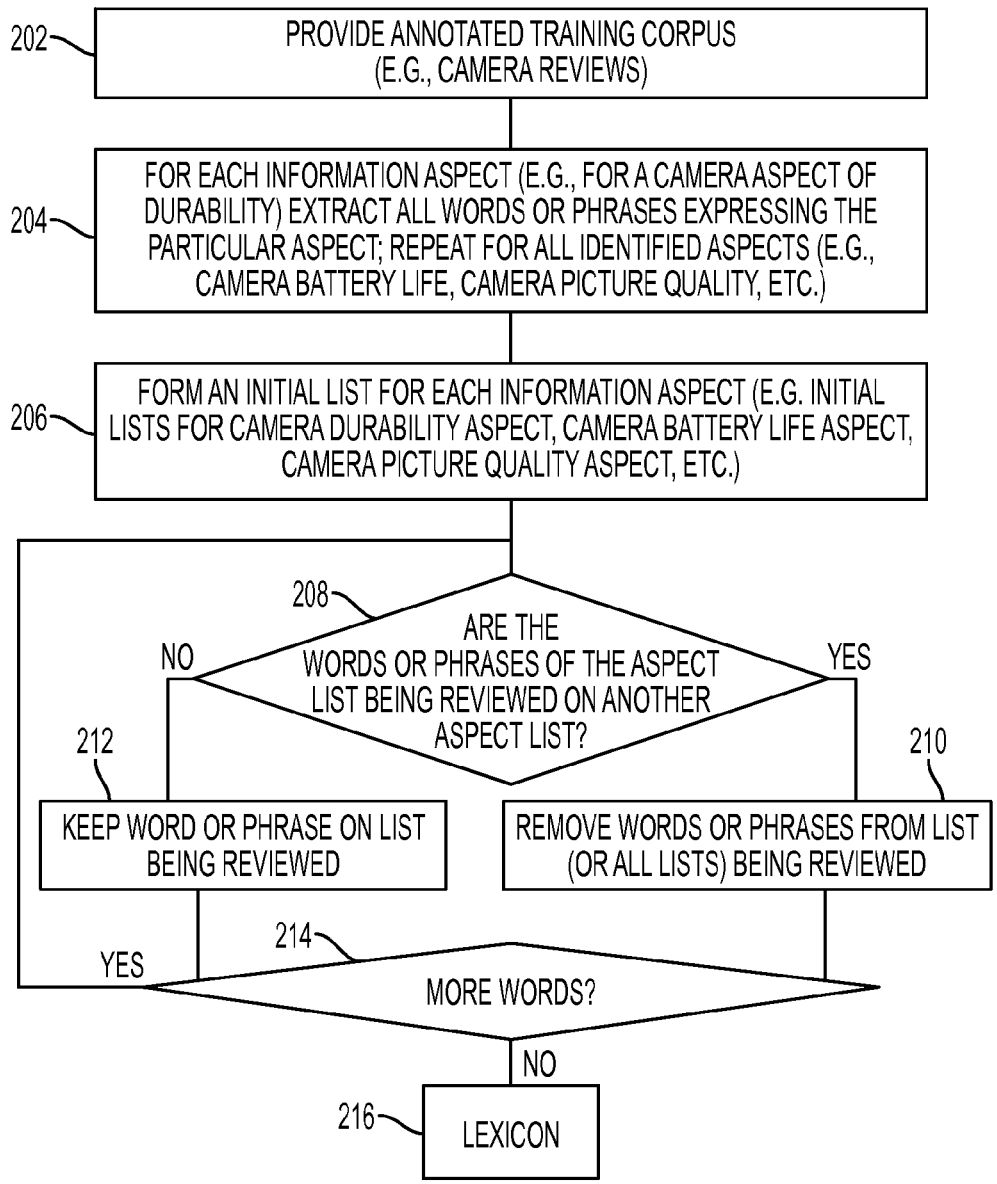
FIG. 2 illustrates a flow diagram presenting a corpus filtered approach according to the present application.

A corpus filtering approach 200 is illustrated in FIG. 2. Initially, an annotated training corpus is provided (202). If a training corpus does not exist for the domain/topic of interest one would need to be constructed, in a manner as would be known in the art. For example, in considering camera reviews a training corpus is constructed by annotating each review that is part of the training corpus. More particularly each sentence of each included camera review to be included in the training corpus is annotated with a camera aspect as well as the associated sentiment being expressed in that sentence. Once constructed (or if an appropriate training corpus already exists) it is straightforward to use this resource to build a foundation for the construction of domain specific lexicons.

Next, for each information aspect (e.g., camera aspect such as 'Durability', 'Picture Quality', etc.) all of the content words and/or phrases that occur in the training sentences labeled as expressing that aspect are extracted (204). The content words and/or phrases that were extracted include nouns, verbs, adjectives, adverbs as well as their negated forms. From this extracted content an initial lexicon list for each information aspect is formed (206).

Then, for each word and/or phrase in the list for each of the camera aspects, a check is made to see if that word or phrase also occurs in a lexicon list of any other camera aspect (208). If yes, that word and/or phrase is removed from the lexicon (210). If the word and/or phrase is not on any other list, the word and/or phrase is maintained on the list (212). These steps are repeated until no additional words and/or phrases are left (214). After this step of filtering, a list of lexicon is obtained for each camera aspect, which contains only words and/or phrases unique to that camera aspect in the training corpus (216).

The quality of the lexicons produced using this approach is in general very high. For example, the following lexicon regarding the camera aspect 'Durability' was generated based on a relatively small training corpus with 2131 sentences covering 23 categories (i.e., 22 camera aspects and a category of 'none', meaning that none of the 22 camera aspects was discussed).

Durability Lexicon: [scratch, construct, build, rock, repair, damage, flimsy, not flimsy, junk, sturdy, sturdier, solid, durable, tough, bent, hard, not worth, firm, rug, broke, bulletproof]

A drawback of this approach is, however, that the coverage of the lexicons would completely rely on the coverage of the corpus, and annotating a broad coverage training corpus is time consuming, expensive and sometimes very difficult for a task such as sentiment analysis because of the richness of natural language.

This drawback is overcome by augmenting the initial domain specific lexicons obtained from the training corpus through web searching and filtering using linguistic patterns as well as dictionary expansion. These two approaches are illustrated in the next two subsections.

1.2 Web Search and Filtering Using Linguistic Patterns

Figure 3:
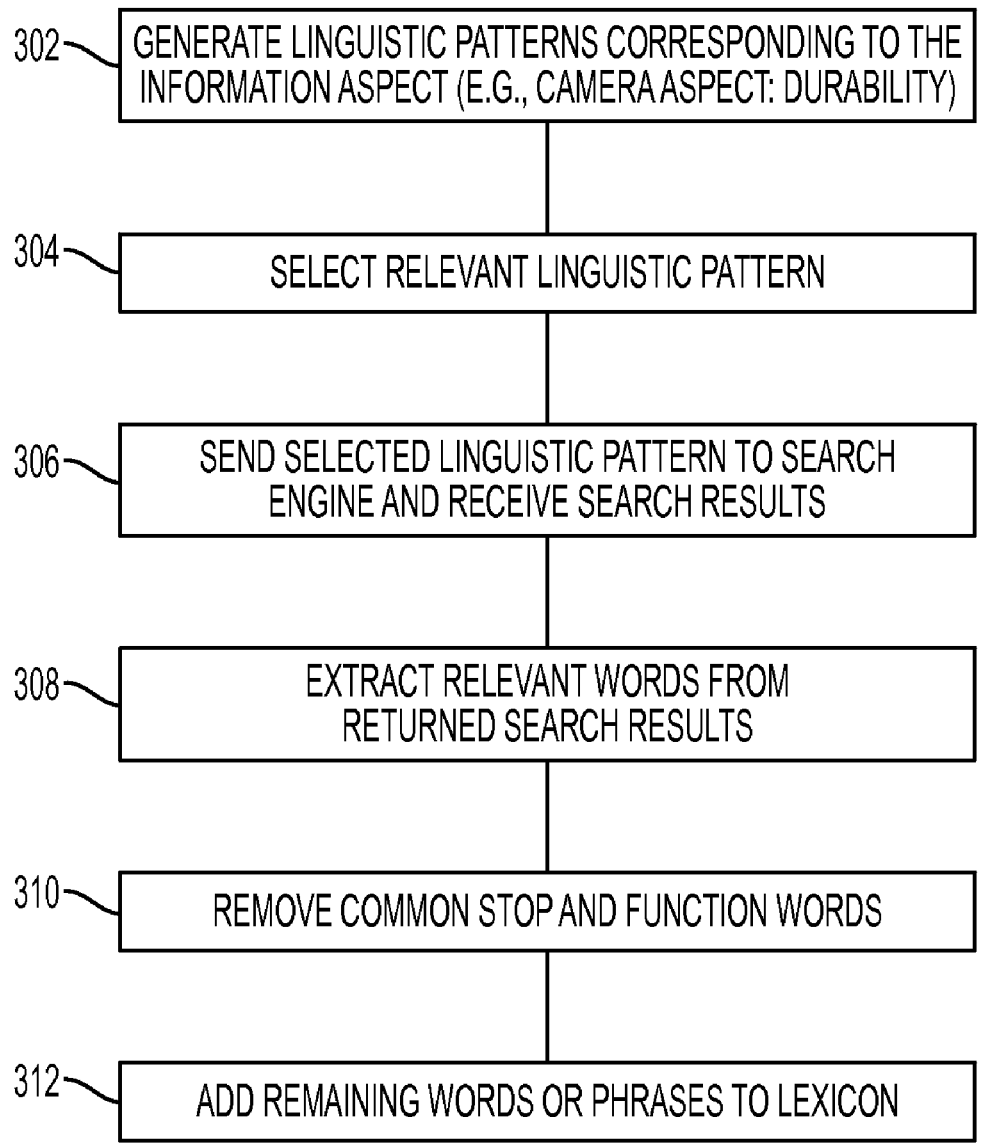
FIG. 3 illustrates a flow diagram showing a process for web searching and filtering using linguistic patterns.

Turning to FIG. 3, a flow diagram 300 is shown for web searching and filtering using linguistic patterns to improve the coverage of the domain specific lexicons obtained from the training corpus. Initially, linguistic patterns are designed (in this example two such linguistic patterns were designed) and used as searching queries to find more words and phrases conceptually associated with information aspects of interest (e.g., the camera aspects) (302). The two linguistic patterns used in the camera review example are:

Pattern 1: 'Camera Aspect include(s) *'
Pattern 2: Camera Aspect+'Seed Word and *'

In these two patterns, 'Camera Aspect' refers to expressions such as 'camera accessories' and 'camera price.' 'Seed Word' refers to seed words for a particular camera aspect. For example, 'cheap' and 'expensive' can serve as seed words for camera aspect price. Note that in Pattern 1, the camera aspect name is included as part of an exact search query, whereas in Pattern 2, the camera aspect name serves as the context for the search query.

Depending on the semantic nature of the information aspect, a particular pattern is selected (e.g., in the example of a camera aspect, one of the two patterns are selected to find expressions conceptually related to that aspect) (304). For example, while 'camera accessories include *' is very effective for finding accessory expressions, 'camera picture'+ 'clear and *' is better for finding expressions related to camera pictures.

The selected linguistic pattern is provided to a search engine which sends the pattern as a query to the internet, resulting in search results being returned (306). For example, when Pattern 1 is used, it is sent as a query to a search engine. In this set of experiments the search engine Bing (from Microsoft Corporation) was used, although it is to be understood other search engines may also be used (e.g., Google, Yahoo, etc.). Next, relevant words from the returned search results are extracted (308). For example, when Pattern 1 is used, words or phrases following 'include' or 'includes' in the top 50 results returned by the search engine are extracted. In each returned result, words that follow 'include' or 'includes' are extracted until the first sentence boundary after 'include' or 'includes' is reached. The next step is to remove common stop words such as 'the' (among others) and function words such as 'with' and 'of' (among others) from the extracted words (310). Finally, the remaining words are added to the list of the appropriate domain specific lexicon formed by the process of FIG. 2 (312). Using this approach the following lexicon for camera accessory is generated in the camera example.

Accessory Lexicon: [chip, chips, case, bag, card, software, tripod, strap, cable, adapt, charger, port, storage, hood, connector, kit, accessory, glove, belt, usb, mic, beltloop, flash, program, leather, pack, connect, not belt, not strap, zipper]

Figure 4:
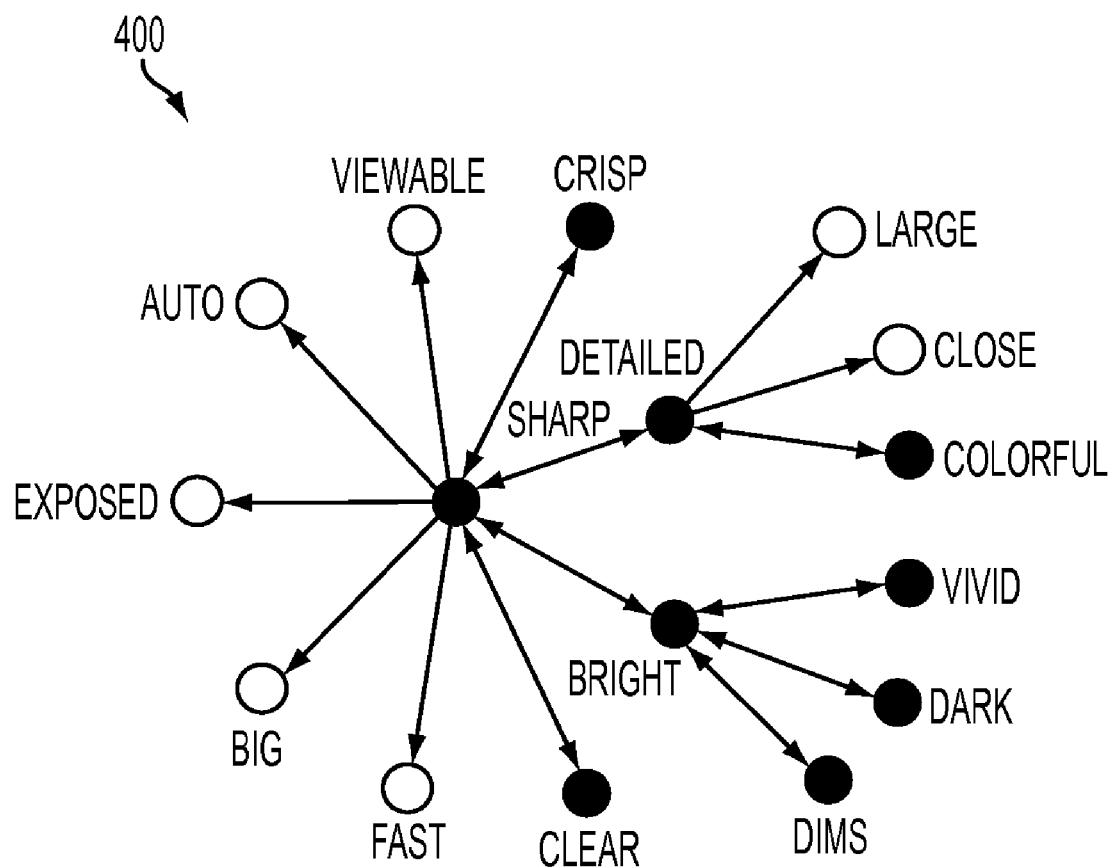
FIG. 4 is a graph showing some noisy words identified by the approach of FIG. 3.

As a further example, when Pattern 2 is used, words in the top 50 returned results are extracted. However, a different algorithm is used for filtering out noise in these returned results. For example, for finding expressions conceptually related to camera's picture quality, 'camera picture' is used as context words and 'clear' as a seed word. This pattern would match both 'clear and sharp' and 'clear and normal'. However, while 'sharp' is commonly used to describe picture quality, 'normal' is not. To filter noisy words such as 'normal', each of the candidate words are used as a new seed word in Pattern 2, and if the top 50 results returned by the new query include the original seed word 'clear', the candidate word is retained. Otherwise, it is discarded. For example, in the experiments, while 'camera picture'+"sharp and *" would return results matching 'sharp and clear', 'camera picture'+ "normal and *" would not return results matching 'normal and clear'. Through this approach, 'sharp' can be distinguished from 'normal', and 'normal' is identified as a noisy word. FIG. 4 shows some of the noisy words identified by this approach when expressions conceptually related to camera pictures were extracted during the mentioned experiments (400). In this figure, words represented by hollow circles are identified as noise and removed from the camera picture quality lexicon. By contrast, words represented by solid circles are retained in the lexicon.

In one embodiment algorithms used for constructing domain specific lexicons when using Pattern 2 are identified below as: Algorithm 1: FindingRelatedWords, which in turn uses the algorithms identified as: Algorithm 2: HarvestByBing and Algorithm 3: is Reversible.

Using this method, the following lexicon for camera picture quality is built by using Pattern 2 as search queries with two seed words 'clear' and 'blurred'.

PictureQuality Lexicon: [clear, sharp, color, bright, Kyocera, response, sober, stable, tidy, vivid, disassemble, detail, texture, safe, fluid, dark, sunny, dim, crisp, focus, pattern, curve, blue, humid, fuzzy, orange, yellow, gray, blurry, blur, cyan, indistinct, grainy, hazy, blurred]

| Algorithm1: FindingRelatedWords |
|---|
| Algorithm: FindingRelatedWords<br>Input: seedword, contextword, depth<br>Output: relatedwordset<br>unprocessed = [seedword] ;<br>relatedwords = [seedword] ;<br>foreach Depth in [1...N] do<br>   \| tempset = [ ] ;<br>   \| foreach word in unprocessed do<br>   \|   \| newwords = HarvestByBing(word,<br>   \|   \| contextword) ;<br>   \|   \| foreach newword in newwords do<br>   \|   \|   \| if isReversable(word, newword,<br>   \|   \|   \| contextword) then<br>   \|   \|   \|   \| Add newword to tempset ;<br>   \| foreach newword in tempset do |

-continued

Algorithm1: FindingRelatedWords

```
|   |   Add newword to relatedwords
|   unprocessed = tempset ;
return relatedwords
```

Algorithm2: HarvestByBing

```
Algorithm: HarvestByBing
Input: word, contextword
Output: newwords
LPattern = contextword + "word and *" ;
newwords = words matching * in texts of top 50
results returned from Bing using LPattern as a
query ;
return newwords
```

Algorithm3: isReversible

```
Algorithm: isReversable
Input: word, newword, contextword
Output: True or False
newwords = HarvestThroughBing(newword,
contextword) ;
if word in newwords then
|   return True
else
|   return False
```

1.3 Dictionary Expansion

Although expansion through looking up synonyms and antonyms recorded in dictionaries is a commonly used approach when a general purpose sentiment lexicon is built, this approach was found to be not always suitable for building domain specific lexicons. The reason is that building domain specific lexicons requires finding expressions that are conceptually related; however expressions that are conceptually related are not necessarily synonyms or antonyms. For example, 'sharp' and 'clear' are conceptually related to camera picture qualities, but they are not true synonyms from a linguistic perspective.

However, in some cases, using dictionaries can still be very effective. For example, the following lexicon for camera price was built through web searching and filtering using Pattern 2.

Price Lexicon: [cheap, lowest, discount, promo, coupon, promote, expensive, worthy, value]

By including the synonyms of 'cheap' and 'expensive' in WordNet (Fellbaum, 1998) as shown below, it is possible to further expand the Price Lexicon.

Synonyms of 'expensive' in WordNet: [expensive, big-ticket, high-ticket, dear, high-priced, pricey, pricy, dearly-won, costly, overpriced]

Synonyms of 'cheap' in WordNet: [cheap, inexpensive, bargain-priced, cut-rate, cut-price, catchpenny, dirt cheap, low-budget, low-cost, low-priced, affordable, dime, penny, halfpenny]

1.4 Domain Specific Polarity Lexicon

Up to this point the configuration of domain specific lexicons have been disclosed, for example, how domain specific lexicons have been built for different camera aspects have been described. The next step is to separate expressions that carry positive sentiment from those that carry negative sentiment in each domain lexicon.

For example, it is desirable to be able to build the following sub-lexicons for 'Picture Quality'.

PictureQuality Positive Lexicon: [clear, sharp, bright, sober, stable, tidy, vivid, sunny, crisp]

PictureQuality Negative Lexicon: [dark, dim, humid, fuzzy, gray, blurry, blur, indistinct, grainy, hazy, blurred]

Figure 5:
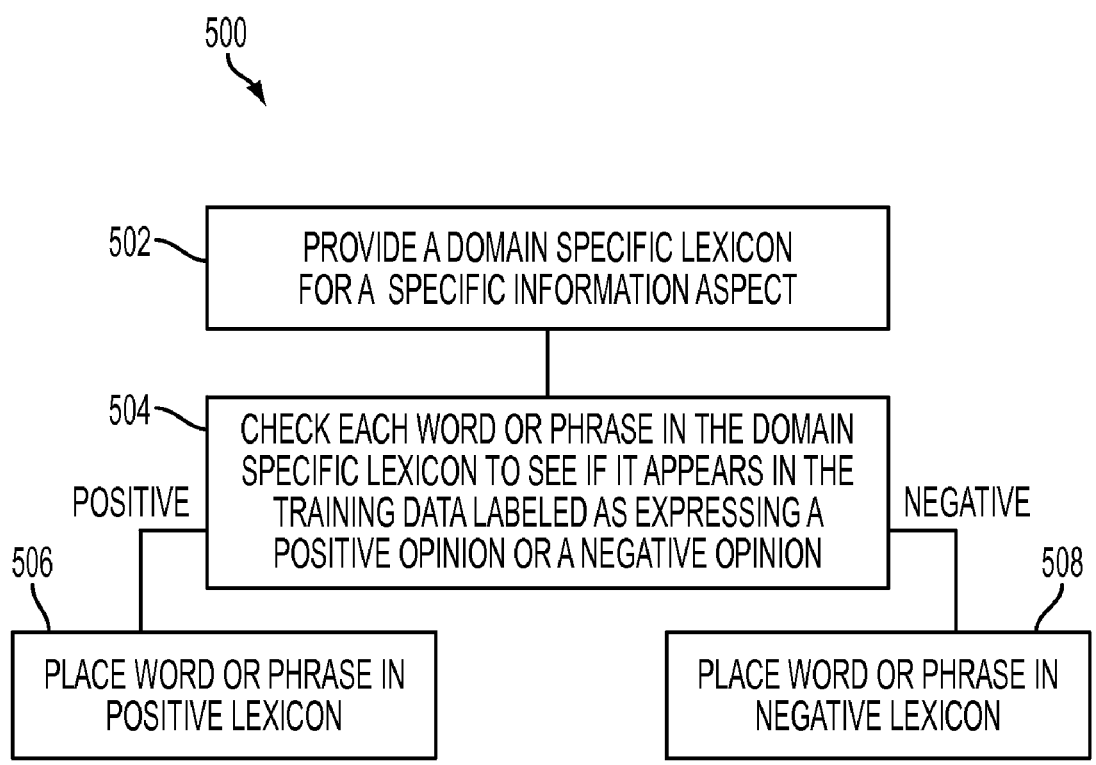
FIG. 5 is a flow diagram illustrating an approach to provide polarity to words and/or phrases of a domain specific lexicon.

Turning to FIG. 5, illustrated is a flow diagram 500 describing an approach to provide polarity to the words and/or phrases in the domain specific lexicon as described above (502). For each expression (e.g., word or phrases) in the generated lexicon (e.g., the Picture Quality Lexicon) that was constructed through the combination of corpus filtering, web search and dictionary expansion, a check is made to see if the word or phrase being checked only appears in the training data labeled as expressing a positive opinion or a negative opinion (e.g., about the camera's picture quality) (504). If it is a positive opinion, that expression is included in the PictureQuality Positive Lexicon (506), while if it is a negative opinion, that expression is included in the PictureQuality Negative Lexicon (508).

Having illustrated the present approach for constructing domain specific sentiment lexicons, next described is how lexicon knowledge is incorporated into SVM learning to improve sentiment classification.

2. Incorporating Lexicon Knowledge into SVM Learning to Improve Sentiment Classification Having generated a domain specific lexicon comprised of a positive domain specific sub-lexicon and a negative domain specific sub-lexicon, the present disclosure now describes incorporation of the words and expressions in the domain specific lexicon into a machine learning system in order to perform a sentiment classification task as follows. For each review sentence about cameras, the sentiment classifier needs to predict both the camera aspect discussed in that sentence as well as the associated sentiment regarding that camera aspect. For example, for the following review sentence:

(1) It uses two (2) batteries and the batteries last longer than my last camera lasted using four (4) batteries.

The sentiment classifier is to identify that this sentence expresses a positive opinion about the battery life of the camera.

Figure 6:
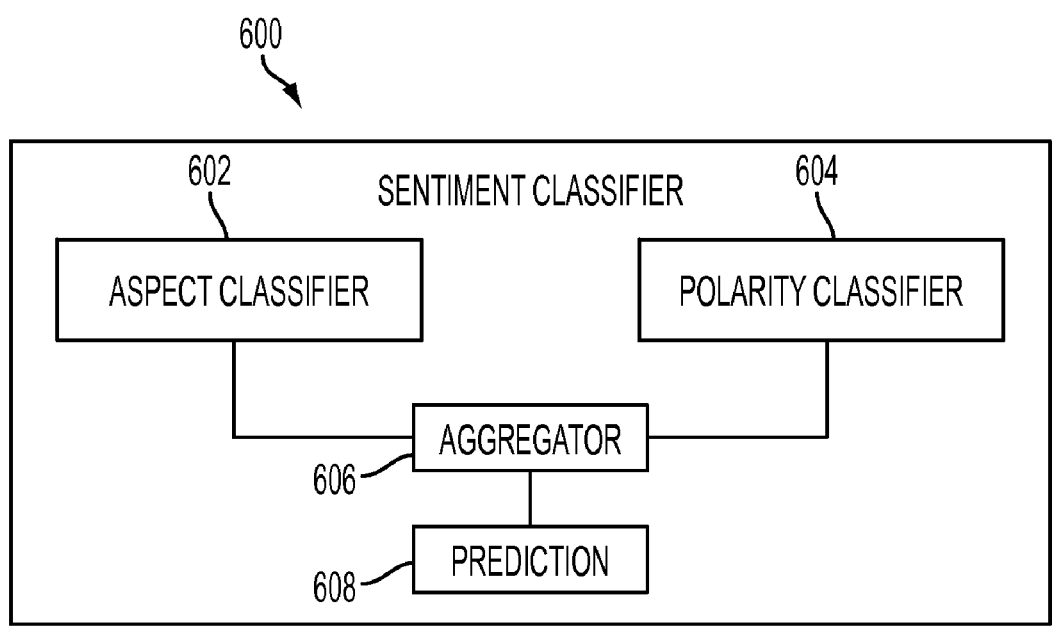
FIG. 6 provides a block diagram illustrating a sentiment classifier having an aspect classifier and a polarity classifier.

This goal is achieved by employing a two-step sentiment classifier 600 as shown in FIG. 6 having an aspect classifier 602 and a polarity classifier 604, to perform a two step classification. In step 1, the aspect classifier 602 of sentiment classifier 600 is trained to predict the aspect (e.g., the camera aspect) being discussed. In step 2, polarity classifier 604 of sentiment classifier 600 is trained to predict the sentiment associated with that aspect. Finally, the two step prediction results are aggregated together in an aggregator 606 to produce the final prediction.

Figure 7:
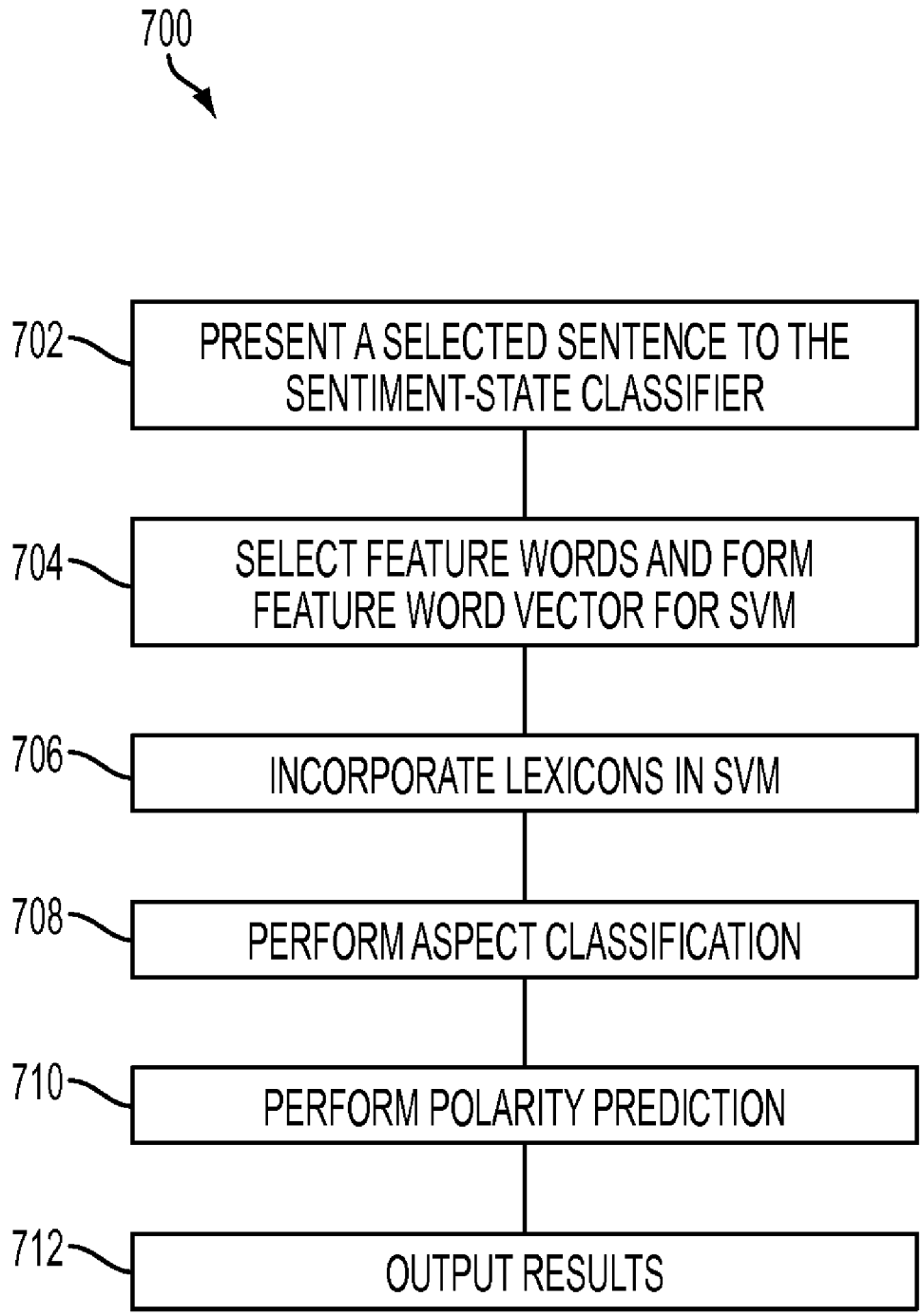
FIG. 7 is a flow diagram depicting the operation of the sentiment classifier of FIG. 6.

In both steps, the lexicon knowledge is incorporated into a conventional machine learning system (e.g., SVM learning). To illustrate this approach, sentence (2) below is used as an example in connection with flow diagram 700 of FIG. 7, where sentence (2) is presented to the SVM (702).

(2) The case is rigid so it gives the camera extra nice protection.

Using nouns, verbs, adjectives and adverbs as feature words in a conventional SVM learning, this sentence is represented as the following vector of words (704).

[case, rigid, give, camera, extra, nice, protection]

The generated lexicons are incorporated into the SVM (706). By this incorporating of the knowledge encoded in the lexicons, additional features are automatically generated and inserted into the above representation.

For example, when step 1 aspect classification is performed (708), because the feature word 'case' in the above representation is listed in the domain specific lexicon about camera accessories, an additional feature word 'accessory' is inserted, and the following new representation is produced.

[case, rigid, give, camera, extra, nice, protection, accessory]

By doing this, possibility of the camera aspect being and 'accessory' is promoted if expressions of camera accessories occur in the sentence.

In the next step of polarity prediction (710), both the domain specific sentiment lexicon and a general purpose domain independent sentiment lexicon extracted from the Multi-Perspective Question Answering (MPQA) opinion corpus (e.g., see Wiebe et al., 2005) are incorporated. Only the words that are indicated as strongly subjective out of context from the MPQA opinion corpus are extracted.

For example, because 'nice' is indicated as a positive word in the MPQA lexicon, a feature word 'positive' would be inserted. In addition, if the first step prediction result for sentence (2) is 'accessory', and 'rigid' is also a positive word in the domain specific lexicon regarding camera accessories, an extra feature word 'positive' would be generated in the final representation for sentence (2) for the second step polarity prediction as shown below.

[case, rigid, give, camera, extra, nice, protection, positive, positive]

Thus a 'positive' prediction is promoted regarding the aspect of 'accessory' (e.g., therefore when additional words are identified as positive words, corresponding additional extra feature "positives" would be added in the final representation).

The experiments show that incorporating lexicon knowledge into SVM learning significantly improves the accuracy for the classification task; compared to the general purpose MPQA sentiment lexicon, the constructed domain specific lexicon is more effective. The experiment setting and results are reported in the next section.

3. Experiment Setting and Results

The sentiment analysis task performed in the experiments is a combined 45-way sentiment classification task. These 45 classes are derived from 22 aspects related to camera purchases such as 'picture quality', 'LCD screen', 'battery life' and 'customer support' and their associated polarity values 'positive' and 'negative', as well as a class of no opinion about any of the 22 aspects. An example of such a class is 'picture quality: positive'. The goal is to map each input sentence into one of the 45 classes.

As mentioned in the previous section, a two step classification is performed for the task. Namely, the final combined classifier consists of two classifiers. The first is the Aspect Classifier, which performs a 23-way camera aspect classification. The second is the Polarity Classifier, which performs a 3-way (positive, negative and none) classification. The final predictions are aggregated from the predictions produced by these two classifiers.

The classification accuracy is defined as follows.

$$Accuracy = \frac{NumberofSentenceCorrectlyClassified}{TotalNumberofSentences} \quad (1)$$

In the experiment the inventors used 2718 manually labeled sentences. All of the sentences are randomly chosen from the Multi-Domain Sentiment Dataset created by Blitzer et al., in "Bollywood, Boom-Boxes, and Blenders", Domain adaptation for sentiment classification, Proc. of the Assoc. for Computational Linguistics (ACL), 2007).

The system and method of the present disclosure has been compared with the idea of incorporating lexicon knowledge with SVM learning and with just a conventional SVM learning, because the latter is the state-of-the-art algorithm reported in the literature for sentiment analysis.

The nouns, verbs, adjectives and adverbs were selected as the unigram word features from the sentences for training and testing. All of them are stemmed using the Porter Stemmer as described by Rijsbergen et al., in "New Models in Probabilistic Information Retrieval", Technical Report, British Library Research and Development Report, No. 5587, 1980. Negators are attached to the next selected feature word. Also used was small set of stop words to exclude copulas and words such as 'take'. The stop words used included copulas and the following words: 'take, takes, make, makes, just, still, even, too, much, enough, back, again, far, same'. The reason that these words were chosen as stop words is because they are both frequent and ambiguous and thus tend to have a negative impact on the classifier. The SVM algorithm that was adopted is implemented by Chang et al., in "LIBSVM: A Library for Support Vector Machines", Software available at http://www.csie.ntu.edu.tw/cjlin/libsvm, 2001). A linear kernel type was used and the default setting for all other parameters was used.

Four (4) experiments were conducted. In experiment 1, the conventional SVM algorithm was used, in which no lexicon knowledge was incorporated; this experiment is referred to as SVM. In experiment 2, only the knowledge encoded in the domain independent MPQA opinion dictionary was incorporated into SVM learning; this experiment is referred to as 'MPQA+SVM'. In experiment 3, only the knowledge encoded in the constructed domain specific lexicons was incorporated into SVM learning; this experiment is referred to as 'DomainLexicons+SVM'. In experiment 4, both the knowledge encoded in the MPQA and the constructed domain specific lexicons was incorporated into SVM learning; this experiment is referred to as 'DomainLexicons+ MPQA+SVM'. All of the experimental results are based on 10-fold cross-validation, and they are summarized in Table 1.

Table 1 shows that incorporating both the domain independent MPQA lexicon and the constructed domain specific lexicons achieves the best overall performance. Of these two types of lexicon, incorporating the domain specific lexicons is more effective, as they contributed the most to the improvement of the classification accuracy. The improvement achieved by our approach is statistically significant with $p<0.000001$ according to paired t-test.

TABLE 1

Overall Performance Comparison

| Learning Method | Accuracy |
|---|---|
| SVM | 41.7% |
| MPQA + SVM | 44.3% |
| DomainLexicons + SVM | 46.2% |
| DomainLexicons + MPQA + SVM | 47.4% |

Table 2 further illustrates that incorporating lexicon knowledge with SVM learning significantly improves both the accuracy for camera aspect classification and the accuracy for polarity classification. Both improvements are statistically significant with $p<0.000001$ and $p<0.05$ respectively according to paired t-test.

TABLE 2

Breakdown Performance Comparison

| Learning Method | Aspect Accuracy | Polarity Accuracy |
|---|---|---|
| SVM | 47.1% | 65.6% |
| DomainLexicons + MPQA + SVM | 56.2% | 66.8% |

4. Why the Disclosed System and Method Works

Section 3 provided empirical evidence that incorporating lexicon knowledge into SVM learning improves the accuracy of sentiment classification. The following offers a theoretical proof on why this is true.

In the case of support vector machines, a data point is viewed as a p-dimensional vector, and the strategy of SVM is to find a (p−1)-dimensional hyperplane that yields the largest separation, or margin between any two classes. The larger the margin between two classes, the more separable these two classes are. The reason the described system and method improves the accuracy of classification is because the extra features that are inserted based on the sentiment lexicons enlarge the distances among points belonging to different classes, while keeping the distances of points belonging to the same class unchanged. A proof is illustrated below.

Suppose point $\vec{a}=(x_1^a, x_2^a, \ldots, x_p^a)$ and point $\vec{b}=(x_1^b, x_2^b, \ldots, x_p^b)$ belonging to class A, and point $\vec{c}=(x_1^c, x_2^c, \ldots, x_p^c)$ and point $\vec{d}=(x_1^d, x_2^d, \ldots, x_p^d)$ belonging to class A and class B In the experiments, SVM is used with linear kernel in which the distance among data points is measured by Euclidean distance among those points. For example, the distance between $\vec{a}$ and $\vec{c}$ and the distance between $\vec{c}$ and $\vec{d}$ equal to Distance$_{old}(\vec{a}, \vec{c})$ and Distance$_{old}(\vec{c}, \vec{d})$ below.

$$Distance_{old}(\vec{a}, \vec{c}) = \sqrt{(x_1^a - x_1^c)^2 + \ldots + (x_p^a - x_p^c)^2}$$

$$Distance_{old}(\vec{c}, \vec{d}) = \sqrt{(x_1^c - x_1^d)^2 + \ldots + (x_p^c - x_p^d)^2}$$

When an extra feature μ is added to all points belonging to class A and a different extra feature v to all points belonging to class B according to the constructed Class/Domain specific lexicons, an extra dimension is added to each of the data points. Then the new distance between $\vec{a}$ and $\vec{c}$ and the new distance between $\vec{c}$ and $\vec{d}$ can be calculated as follows.

$$Distance_{new}(\vec{a}, \vec{c}) =$$
$$\sqrt{(x_1^a - x_1^c)^2 + \ldots + (x_p^a - x_p^c)^2 + (\mu - \mu)^2} - Distance_{old}(\vec{a}, \vec{c})$$

$$Distance_{new}(\vec{c}, \vec{d}) =$$
$$\sqrt{(x_1^c - x_1^d)^2 + \ldots + (x_p^c - x_p^d)^2 + \mu^2 + v^2} > Distance_{old}(\vec{c}, \vec{d})$$

It is clear from the above calculations that the distance between $\vec{a}$ and $\vec{c}$ remains the same whereas the distance between $\vec{c}$ and $\vec{d}$ will be enlarged after the extra feature word μ is added to all points in class A and v is added to all points in class B.

Figure 8:
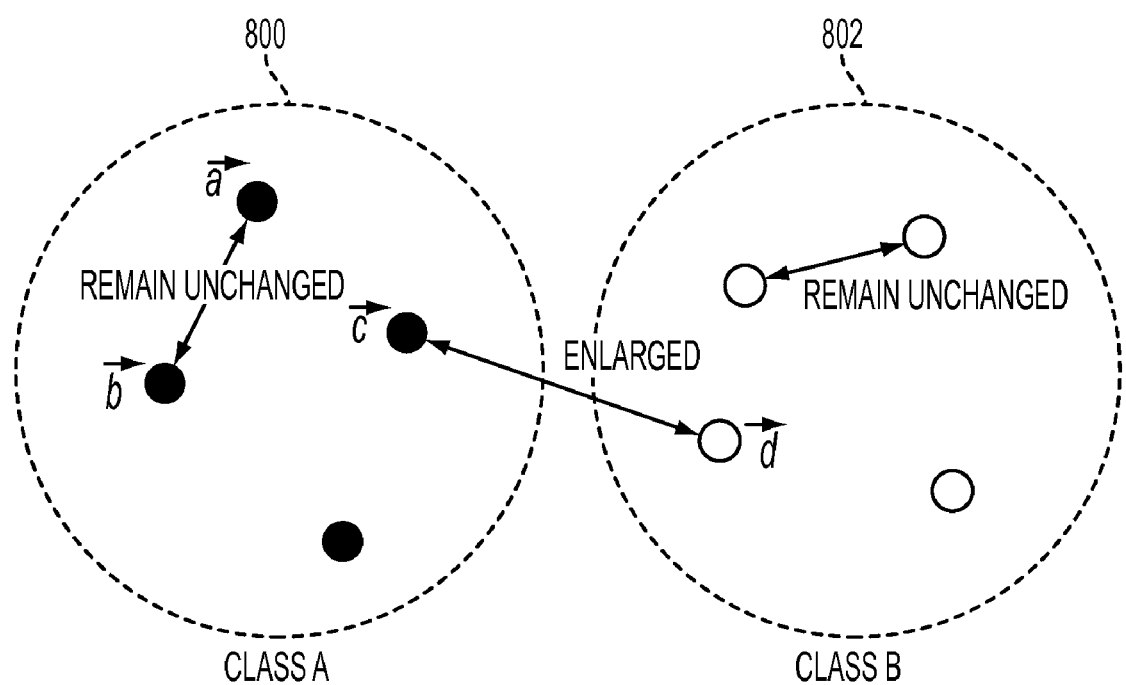
FIG. 8 is an illustration showing distances between points belonging to classes.

To summarize, as illustrated in FIG. 8, while the distance between points belonging to the same class (i.e., Class A (800) or Class B (802)) remains unchanged, the distance between points belonging to different classes will be enlarged after the extra feature words are inserted according to our Class/Domain specific lexicons.

This also means that after adding the extra features, SVM can find a hyperplane with a larger margin, or with same length of margin but fewer support vectors, that can separate classes more effectively. This in turn leads to higher accuracy for classification.

5. System Configuration

Figure 9:
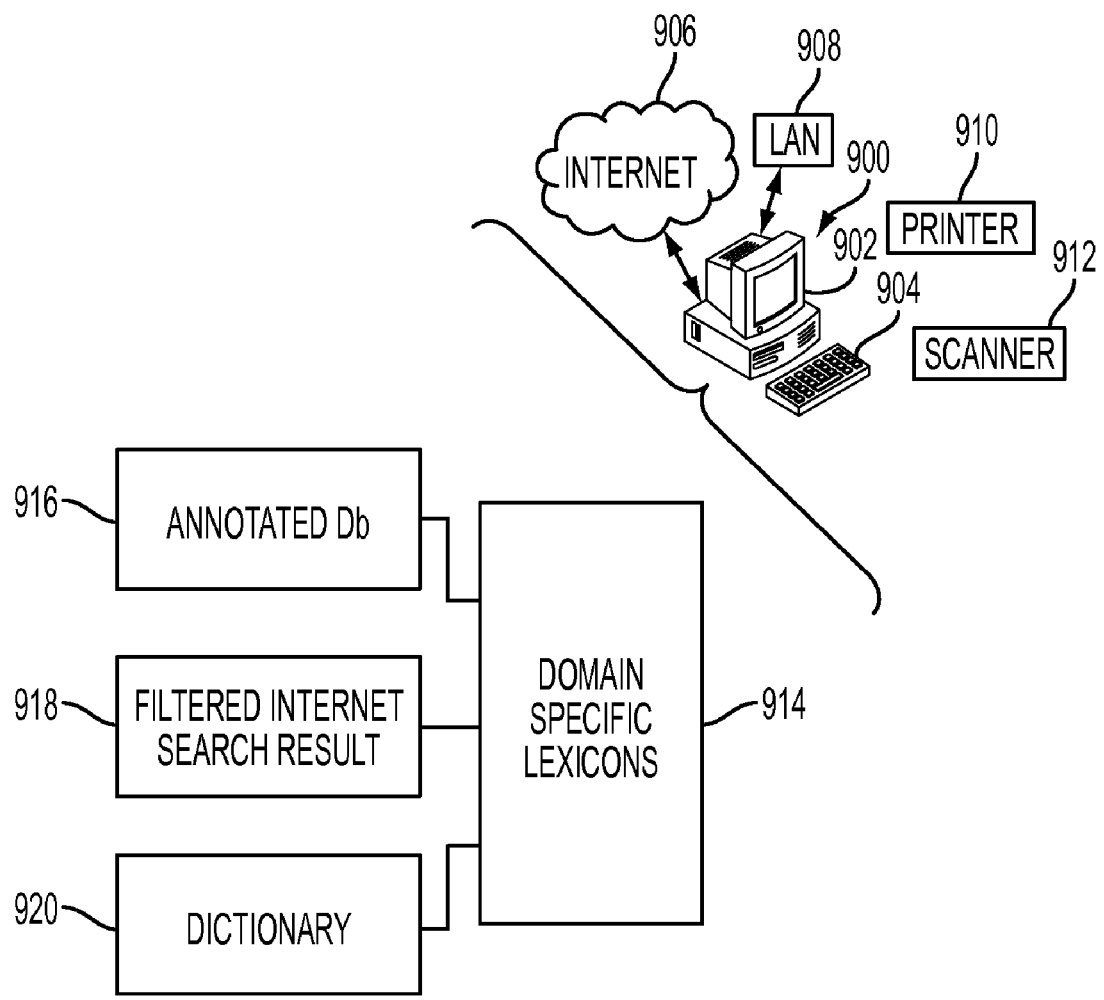
FIG. 9 depicts the system of the present application during the process of creation of domain specific lexicons.
Figure 10:
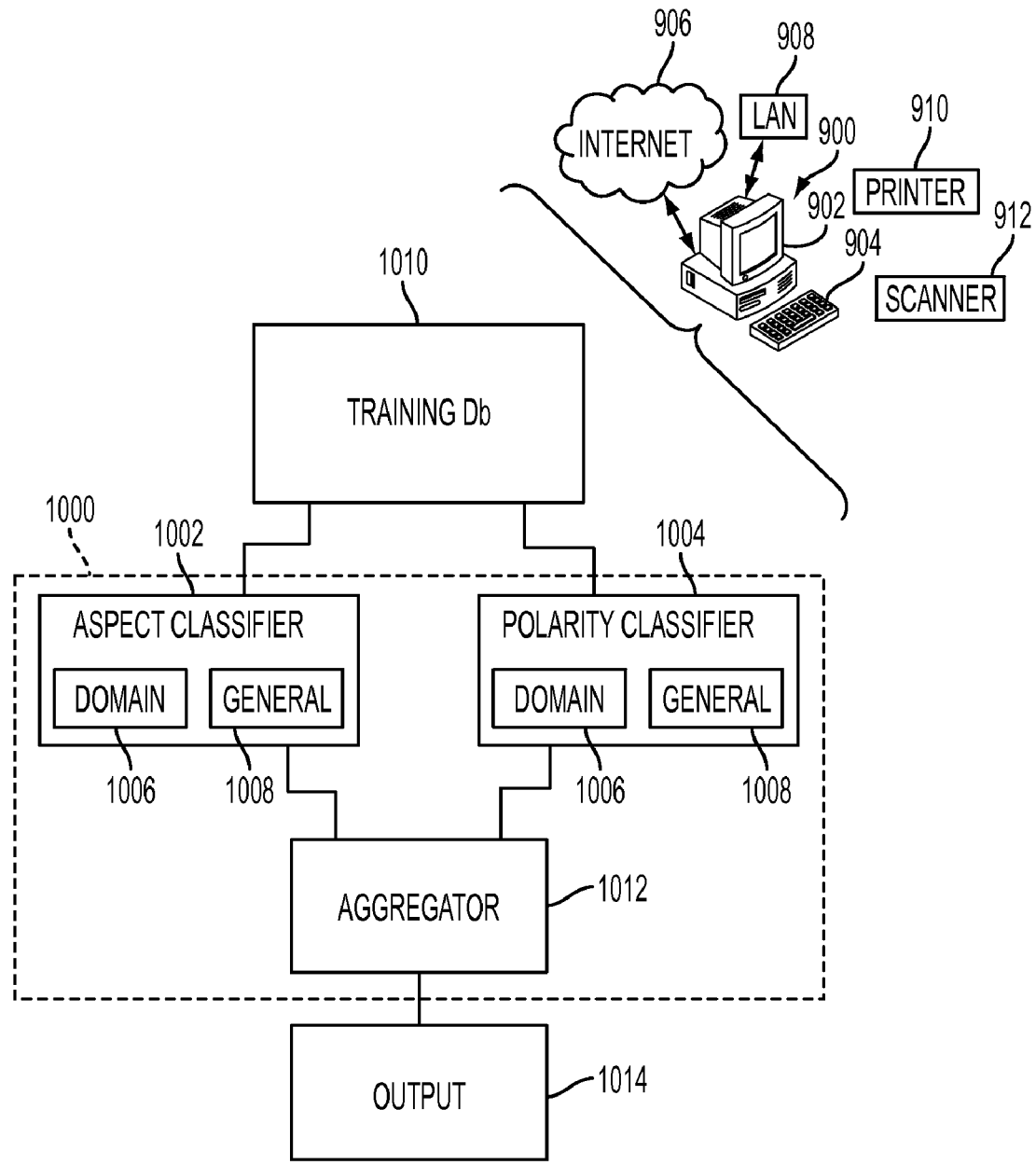
FIG. 10 depicts the structure of the present system during the process when the sentiment classifier is being trained.
Figure 11:
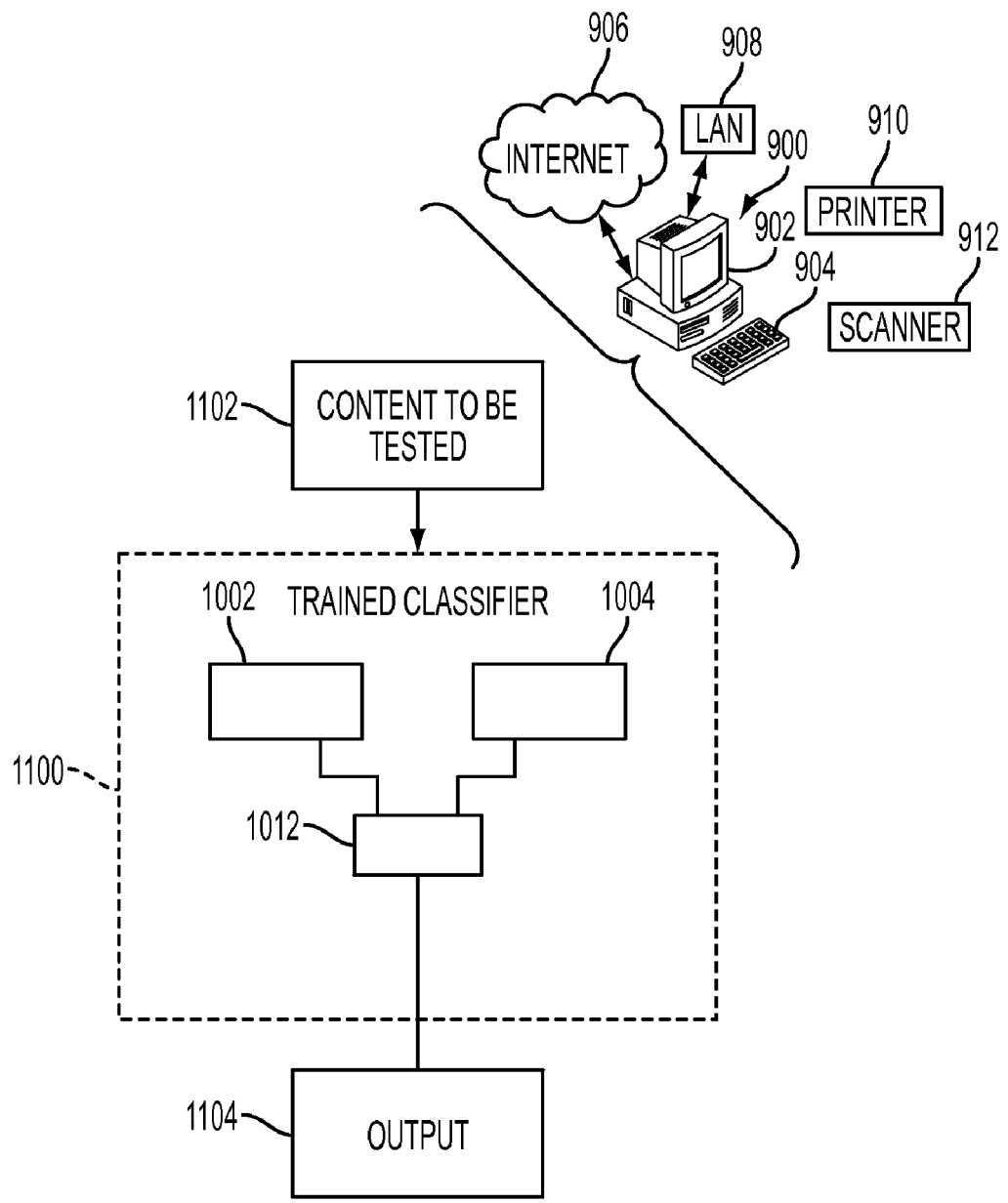
FIG. 11 depicts the structure of the present system when the sentiment classifier is operating.

With reference to FIGS. 9-11, illustrated is a system configuration in which the methods of the present disclosure are achieved. Particularly, FIGS. 9-11 illustrate various stages of the development of the sentiment classifier including, (i) the generation of domain specific lexicons which are incorporated into the sentiment classifier, (ii) the training of the sentiment classifier, and (iii) the operation of the sentiment classifier, including sentiment analysis on various types of textual documents including but not limited to articles, newspapers, blogs, magazines which may be presently existing in an electronic format, such as on the Internet, or in a hard copy which is then scanned into an electronic format or otherwise electronically read by the system.

In embodiments the sentiment classification system is suitably embodied as a computer 900 or other digital processing device running suitable software to configure, train the segment classifier and to perform segment analysis. The illustrated computer 900 includes a display 902 for displaying results and an input device (keyboard, mouse, etc.) 904 for facilitating user control of the sentiment classifier. The computer 900 is also configured with appropriate interconnections to access the Internet 906 as well as a local area network 908, printer 910 and scanner 912, the printer being capable of printing out a hard copy of a document which may be considered output from the sentiment classifier, and the scanner being configured to scan in hard copy documents in order to manipulate the hard copy documents in an electronic version for sentiment analysis.

The software is suitably embodied as instructions stored on a magnetic disc, optical disc, magnetic tape, FLASH memory, random access memory (RAM), read only memory (ROM), or other storage medium, such instructions being executable by computer 900 or other digital device to perform the disclosed construction, training and operation of a sentiment classifier capable of performing sentiment analysis.

With continuing attention to FIG. 9, the system of the present application at this stage is operating to develop the domain specific lexicons 914 by the use of an annotated database 916, filtered Internet search results 918 and dictionaries 920. Once the domain specific lexicons have been developed, the sentiment classifier is trained. Particularly, as shown in FIG. 10, the two-stage sentiment classifier design 1000 includes aspect classifier 1002 and polarity classifier 1004. As shown these classifiers have incorporated at least a portion of sentiment labeled domain specific lexicons 1006 and sentiment labeled general lexicons 1008. During the training operations data from a training database 1010 is supplied to the sentiment classifier 1000, which operates in the data. The outputs of the aspect classifier 1002 and the polarity classifier 1004 are further configured to supply their outputs to an aggregator 1012 to generate prediction outputs 1014. Once the sentiment classifier 1000 has been trained, sentiment analysis is undertaken. For example, as shown in FIG. 11, the trained sentiment classifier 1100 receives content 1102, which is analyzed to generate an output 1104. Particularly, the content is analyzed on a sentence-by-sentence basis and a prediction as to the sentiment of the text being analyzed is generated as the output 1104.

6. Conclusion

It has been shown that incorporating the knowledge encoded in sentiment lexicons, especially domain specific lexicons, can significantly improve the accuracy for fine-grained sentiment analysis tasks. Also described is the method of constructing domain specific sentiment lexicons, with a specific example being the construction of domain specific sentiment lexicons for the domain of camera reviews, where such a construction includes a combination of corpus filtering, web searching and filtering and dictionary expansion. In addition, a method has been developed and shown to incorporate the lexicon knowledge into machine learning algorithms such as SVM to improve sentiment learning.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A non-transitory computer readable medium carrying instructions for a sentiment classifier for sentiment classification of content comprising:
an aspect classifier configured to classify content as being related to a particular aspect of a plurality of aspects of information, the aspect classifier incorporating at least a portion of a domain specific sentiment lexicon to assist in classifying the content, wherein the domain specific sentiment lexicon is configured by: (i) domain specific words and/or phrases from an annotated corpus which has been filtered, (ii) domain specific words and/or phrases obtained via a search of the world wide web using a predetermined linguistic pattern and filtering the returned search results, and (iii) domain specific words and/or phrases obtained via a dictionary expansion technique performed on the domain specific words and/or phrases obtained by at least one of (i) or (ii);
a polarity classifier configured to classify the content classified by the aspect classifier as having one of a positive sentiment of the particular aspect of information, a negative sentiment of the particular aspect of information or as having no sentiment of the particular aspect of information, the polarity classifier incorporating at least a portion of the domain specific sentiment lexicon to assist in classifying the content; and
an aggregator configured to receive and aggregate results of predictions generated by the aspect classifier and results of predictions generated by the polarity classifier.

2. The sentiment classifier of claim 1 wherein the aspect classifier further incorporates a general purpose sentiment lexicon.

3. The sentiment classifier of claim 1 wherein the polarity classifier further incorporates a general purpose sentiment lexicon.

4. The sentiment classifier of claim 1 being implemented as a Support Vector Machine.

5. The sentiment classifier of claim 1 wherein the content is text configured in the form of sentences having words and/or phrases.

6. The sentiment classifier of claim 5 further configured to classify the content at the sentence level as being positive, negative or having no sentiment as to the particular aspect of information.

7. The sentiment classifier of claim 6 further configured to predict a main topic associated with the sentiment at the sentence level.

8. The sentiment classifier of claim 1 wherein the domain specific sentiment lexicon includes a sub-lexicon classifying the domain specific words and/or phrases as being associated with one of the aspects of information and another sub-lexicon associating a sentiment to the classified one aspect of information.

9. The method of claim 1, wherein the words and/or phrases which have been filtered from the annotated corpus have been filtered by:
identifying aspects of information;
extracting the words and/or phrases from the annotated corpus in sentences labeled as expressing the identified aspects of information;
forming initial lists of lexicons corresponding to the identified aspects of information from the extracted words and/or phrases;
checking the words and/or phrases from the initial lists of lexicons for the identified aspects of information against the other initial lists of lexicon for the other aspects of information;
filtering out any words and/or phrases from the initial lists of lexicons for the aspects of information which matches words and/or phrases from any of the other initial lists of lexicons for the other aspects of information; and
generating filtered lists of lexicons for the aspects of information representing domain specific lexicons.

10. The method of claim 1, wherein content obtained via a search of the world wide web or internet is obtained by:
generating linguistic patterns corresponding to selected aspects of information;
selecting one of the generated linguistic patterns;
sending via a search engine the selected linguistic pattern to the world wide web or internet to obtain search results based on the selected linguistic pattern;
extracting words and/or phrases from the results returned from the search;
filtering out noise words and/or phrases by one of (i) removing predetermined stop words and/or phrases or (ii) using each of candidate content (words) as a new seed content (word) and redoing a search and when the original seed content (word) is retuned keeping the content (word), otherwise filtering out the content (word); and
adding the words and/or phrases that remain to the domain specific lexicon.

11. The method of claim 1, wherein the dictionary expansion includes finding at least one of synonyms and antonyms to words and/or phrases in the list, and adding at least one of the synonyms and antonyms to the list.

12. A method of performing sentiment classification of content comprising:
classifying the content as being related to a particular aspect of a plurality of aspects of information by an aspect classifier, wherein the aspect classifier incorporates at least a portion of a domain specific sentiment lexicon, wherein the domain specific sentiment lexicon is configured by (i) obtaining domain specific words and/or phrases by filtering an annotated corpus, (ii) obtaining domain specific words and/or phrases by searching the world wide web via the internet using a predetermined linguistic pattern and filtering returned search results, and (iii) performing a dictionary expansion operation on domain specific words and/or phrases obtained via (i) and (ii);

classifying the content classified by the aspect classifier as having one of a positive sentiment of the particular aspect of information, a negative sentiment of the particular aspect of information or as having no sentiment of the particular aspect of information by use of a polarity classifier, wherein the polarity classifier incorporates at least a portion of the domain specific sentiment lexicon; and aggregating received results of predictions by the aspect classifier and received results of predictions by the polarity classifier, wherein the method is performed using at least one electronic processor.

13. The method of claim 12 wherein the aspect classifier further incorporates a general purpose sentiment lexicon.

14. The method of claim 12 wherein the polarity classifier further incorporates a general purpose sentiment lexicon.

15. The method of claim 12 wherein the aspect classifier and the polarity classifier are assembled together to form a sentiment classifier implemented as a Support Vector Machine.

16. The method of claim 12 wherein the content is text configured in the form of sentences having words and phrases.

17. The method of claim 16 further including classifying the content at the sentence level as being positive, negative or having no sentiment of the particular aspect of information.

18. The method of claim 15 further including predicting a main topic associated with the sentiment at the sentence level.

* * * * *